UNITED STATES PATENT OFFICE 1,948,528

PURIFICATION OF HYDROCARBON OILS

William M. Malisoff, Philadelphia, Pa., assignor to The Atlantic Refining Company, Philadelphia, Pa., a corporation of Pennsylvania No Drawing. Application December 13, 1930
Serial No. 502,254

9 Claims. (Cl. 196—30)

The present invention relates to the art of purifying hydrocarbon oils, such as petroleum and its products, with particular reference to the removal of organic sulfur compounds therefrom.

Practically all crude petroleum oils contain appreciable amounts of sulfur compounds, portions of which appear in the lighter fractions which are separated from the crude petroleum by distillation. These sulfur compounds are objectionable in all types of petroleum oil, but are particularly undesirable in the lower boiling fractions such as naphthas, gasoline and lamp oil, because of the odor and corrosive effect which attend their presence.

The object of my invention is to effect the removal of organic sulfur compounds from hydrocarbon oils containing the same, particularly from relatively low boiling petroleum oils.

Aluminum chloride has long been used in the art for the treatment of hydrocarbon oils, and its uses in this respect have been most varied. That is, it is well known in the art that aluminum chloride may have a wide variety of effects upon hydrocarbon oils, depending upon the particular conditions under which treatment is brought about.

The present invention is based upon my discovery that under certain conditions hereinafter described it is possible to obtain a selective polymerization by anhydrous aluminum chloride of organic sulfur compounds contained in hydrocarbon oils, such as petroleum and its products. The conditions referred to include time and extent of treatment, temperature, and nature and amount of the catalytic material, the proper regulation of these conditions within their allowable limits leading to a selective polymerization of the sulfur compounds without substantially affecting the other constituents of the oil with which it is possible to react aluminum chloride under other conditions.

My invention contemplates the use of an anhydrous catalytic metallic halide, such as aluminum chloride, titanium chloride, ferric chloride, zinc chloride and tin chloride. Reference herein and in the appended claims to a "catalytic metallic halide" is intended to include one or more of the above mentioned substances or their equivalents. Anhydrous aluminum chloride is preferred, however, and my invention and the conditions necessary to effect selective polymerization will be described with particular reference to this preferred substance.

The oil from which it is desired to remove sulfur compounds, for instance, gasoline obtained by cracking or otherwise, is treated for not more than substantially one hour at a temperature between 100° C. and 150° C. with from 0.5 to 4 per cent of anhydrous aluminum chloride, the mixture being agitated during treatment. When the reaction has proceeded to the desired extent the treated gasoline is separated from the catalyst, for example, by filtration or by settling and decanting.

In carrying out my process the sulfur-containing oil is heated to and maintained at a temperature between substantially 100° C. and 150° C. To this body of oil is added an amount of anhydrous aluminum chloride, preferably after the oil has reached the proper temperature, comprising 0.5 per cent to 4 per cent by weight of the oil. In many catalytic reactions time and temperature of treatment and amount of catalyst are merely complementary factors which determine the extent of the desired reaction. However, in my process for selective polymerization of sulfur compounds, change of any of these conditions beyond the specified limits effects catalysis of deleterious reactions leading to an undesirable final result.

If the sulfur-containing oil is treated at a temperature below substantially 100° C. the aluminum chloride effects undesirable reactions, such as chlorination. Similarly, above 150° C. the aluminum chloride brings about cracking of sulfur compounds with evolution of hydrogen sulfide as well as cracking of hydrocarbons and other unwanted reactions, with little regard to the selective polymerization of sulfur compounds. After selective polymerization of the organic sulfur compounds, the aluminum chloride is free to effect the reactions next preferred, such as cracking. For this reason, it is desirable to confine the time of treatment to the minimum necessary for the polymerization of sulfur compounds. I found this time to be not more than substantially one hour for most petroleum products, the optimum time within this limit of substantially one hour being dependent upon such factors as the amount and nature of the sulfur compounds present in the oil.

Another factor that determines whether desirable or undesirable reactions occur is the quantity of catalyst employed. It is my discovery that by using proper amounts of aluminum chloride under regulated conditions it is possible to effect the polymerization of sulfur compounds in preference to other reactions, this apparently being due to the absence of an amount of aluminum chloride over that which is required for the polymerization of sulfur compounds. I have found the proper amount of aluminum chloride to be between 0.5 per cent and 4 per cent by weight of the oil, the optimum amount within these limits depending upon the particular oil. Ordinarily, a straight-run gasoline or one obtained by non-cracking distillation will require between 0.5 per cent and 2 per cent of aluminum chloride, whereas a gasoline obtained by cracking will necessitate the use of from about 2 per cent to 4 per cent of the catalyst. This is probably due to the fact that the sulfur compounds in gasoline obtained by cracking are more difficult to polymerize than the sulfur compounds occurring in straight-run fractions. It is desirable to agitate the mixture of oil and aluminum chloride during the period of reaction to expose fresh surfaces of the catalyst and to prevent undesirable side reactions due to accumulation of the catalyst in certain portions of the gasoline.

As substantial amounts of the lighter fractions of petroleum, such as gasoline, vaporize at or below the operating temperatures specified, the reaction may be carried out under reflux conditions whereby the volatilized constituents are returned to the reaction mixture to again contact the catalyst, or the volatile constituents of the oil may be collected after condensation and blended with the fractions which remain in the treating vessel throughout the aluminum chloride treatment. In practical operation the latter procedure is advantageous, since the low boiling fraction which vaporizes below 100° C. generally contains very little sulfur. The process may also be carried out under pressure, whereby vaporization of the volatile constituents is inhibited.

My invention will be further explained by reference to the following examples:

*Example 1*

A straight-run gasoline obtained from a Texas crude petroleum and having a sulfur content of 0.29 per cent was refluxed with one per cent of anyhydrous aluminum chloride for one hour at 120° C., the mixture being agitated during this treatment. The organic sulfur compounds were polymerized to form higher boiling products which in association with the aluminum chloride separate from the main body of the gasoline upon settling to form a tar-like sludge. After withdrawal of the sludge the gasoline was washed with a small amount of sodium hydroxide solution to remove any small quantities of aluminum chloride dissolved or suspended therein. This purified product showed a sulfur content of 0.07 per cent and was substantially free from the disagreeable odor which accompanied the untreated gasoline.

*Example II*

Gasoline obtained from the thermal decomposition of a Mid-Continent gas oil was agitated with 3 per cent by weight of anhydrous aluminum chloride for one hour at a temperature of 145° C. This treatment reduced the sulfur content of the gasoline from 0.35 per cent to 0.08 per cent.

Comparison of the iodine number of the oil in each of the examples before and after treatment showed substantially no decrease in un- saturates, while specific gravity and boiling range of the treated gasoline were substantially the same as in the untreated gasoline, showing that the constituents other than sulfur compounds were substantially unaffected by the treatment. During the treatment there was substantially no liberation of hydrogen sulfide as evidenced by the fact that no test for it was obtained in a caustic soda absorption tower connected to the treating vessel.

As there is some tendency in my process for the formation of hydrogen halide in a more or less active state, particularly where specified conditions are not properly regulated, I have found it advantageous to carry out the polymerization of sulfur compounds in the presence of free metals, such as aluminum, zinc or iron, preferably the same metal as is used in the catalytic metallic halide, whereby any hydrogen halide formed reacts with the free metal to reform a catalytic metallic halide rather than combining with the constituents of the oil to form undesirable products.

The selective action of the catalytic metallic halide may be enhanced by the addition of a small amount of aromatic compounds, this reresult apparently being due to the formation of highly polar addition compounds of the catalytic metallic halide with the aromatic compounds, which addition compounds are operable to cause the polymerization of sulfur compounds but have less tendency to cause undesirable reactions such as polymerization of unsaturated hydrocarbons contained in the oil. Benzene is an example of an aromatic compound which forms suitable addition compounds with the catalytic metallic halides specified herein.

In the appended claims the term "relatively low boiling petroleum oils" is used to designate naphthas, gasoline and lamp oils and the like, which when subjected to the A. S. T. M. assay distillation test D—86—30 show at least 80% distilled at 600° F.

What I claim is:

1. A process for reducing the sulfur content of a petroleum oil, which comprises maintaining said oil at a temperature between substantially 100° C. and 150° C. while in the presence of from 0.5 per cent to 4 per cent of anhydrous aluminum chloride, agitating the resultant mixture of oil and aluminum chloride for not more than substantially one hour to selectively polymerize sulfur compounds contained in said oil without substantially affecting other components of the oil, and separating the polymerized sulfur compounds and aluminum chloride from the oil.

2. A process for reducing the sulfur content of a relatively low boiling petroleum oil, which comprises maintaining said oil while in the presence of from 0.5 per cent to 4 per cent of anhydrous aluminum chloride at a temperature between substantially 100° C. and 150° C., agitating the mixture of oil and aluminum chloride for not more than substantially one hour, whereby aluminum chloride causes the selective polymerization of sulfur compounds contained in said oil without substantially affecting other components of the oil and separating the polymerized sulfur compounds and aluminum chloride from the oil when said polymerization is substantially complete.

3. A process for reducing the sulfur content of a relatively low boiling petroleum oil obtained by non-cracking distillation, which comprises heating said oil to a temperature between substantially 100° C. and 150° C., adding from 0.5 per cent to 2 per cent of anhydrous aluminum chloride to the heated oil, agitating the resultant mixture of oil and aluminum chloride, whereby the aluminum chloride causes the selective polymerization of sulfur compounds contained in the oil without substantially affecting other components of the oil, and separating the aluminum chloride from admixture with the oil after not more than substantially one hour.

4. A process for reducing the sulfur content of a relatively low boiling petroleum oil obtained by cracking, which comprises heating said oil to a temperature between substantially 100° C. and 150° C., adding from 2 per cent to 4 per cent of anhydrous aluminum chloride to the heated oil, agitating the resultant mixture of aluminum chloride and oil, whereby the aluminum chloride causes the polymerization of sulfur compounds contained in the oil without substantially affecting other components of the oil, and separating the aluminum chloride from admixture with the oil after not more than one hour.

5. A process for reducing the sulfur content of a relatively low boiling petroleum oil, which comprises maintaining said oil while in the presence of from 0.5 per cent to 4 per cent of anhydrous aluminum chloride at a temperature between substantially 100° C. and 150° C., agitating the resultant mixture of oil and aluminum chloride, whereby the aluminum chloride causes the polymerization of sulfur compounds contained in the oil, separating the aluminum chloride from admixture with said oil after not more than one hour, condensing the oil which vaporizes during the heating period, and blending the resultant condensate with the oil which is separated from the aluminum chloride.

6. A process for reducing the sulfur content of a relatively low boiling petroleum oil, which comprises heating said oil to a temperature between substantially 100° C. and 150° C., adding from 0.5 per cent to 4 per cent of anhydrous aluminum chloride to the heated oil, agitating the resultant mixture of oil and aluminum chloride, whereby the aluminum chloride causes the polymerization of sulfur compounds contained in the oil, separating the aluminum chloride from admixture with said oil after not more than one hour, condensing the more volatile constituents which vaporize during the heating of the oil, and returning the resultant condensate to the oil during the polymerization reaction.

7. A process for reducing the sulfur content of a relatively low boiling petroleum oil, which comprises heating said oil to a temperature between substantially 100° C. and 150° C., adding from 0.5 per cent to 4 per cent of anhydrous aluminum chloride to the heated oil, agitating the resultant mixture of oil and aluminum chloride, whereby the aluminum chloride causes the polymerization of sulfur compounds contained in the oil, separating the aluminum chloride from admixture with said oil after not more than one hour, said process being effected at a pressure which inhibits the vaporization of the more volatile constituents of the oil.

8. A process for reducing the sulfur content of a petroleum oil, which comprises maintaining the temperature of said oil between substantially 100° C. and 150° C. while in admixture with from 0.5 per cent to 4 per cent of anhydrous aluminum chloride and a free metal, agitating said admixture, whereby sulfur compounds contained in said oil are selectively polymerized, and separating the oil from insoluble substances in admixture therewith when said polymerization is substantially complete.

9. A process for reducing the sulfur content of a petroleum oil, which comprises maintaining the temperature of said oil between substantially 100° C. and 150° C. while in admixture with from 0.5 per cent to 4 per cent of anhydrous aluminum chloride and an aromatic compound capable for forming an addition compound with said aluminum chloride, agitating said admixture, whereby sulfur compounds contained in said oil are selectively polymerized, and separating the oil from the aluminum chloride and polymerized sulfur compounds when said polymerization is substantially complete.

WILLIAM M. MALISOFF.